June 17, 1969  G. F. BLANK  3,449,819
EXPLOSIVELY WELDED HONEYCOMB METHOD
Filed May 17, 1968  Sheet 1 of 2

INVENTOR.
GEORGE F. BLANK
BY Townsend and Townsend
ATTORNEYS

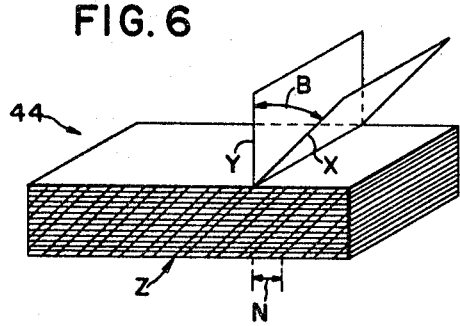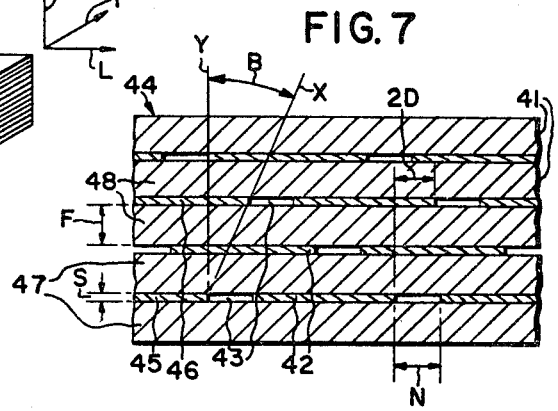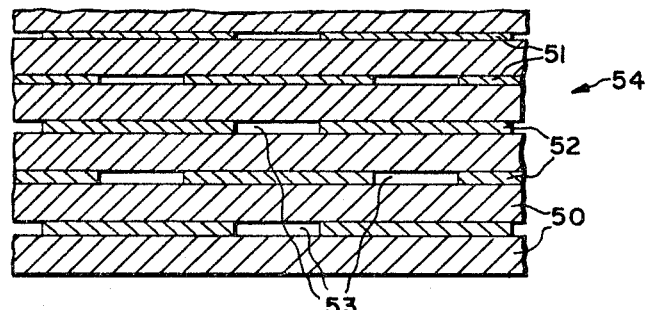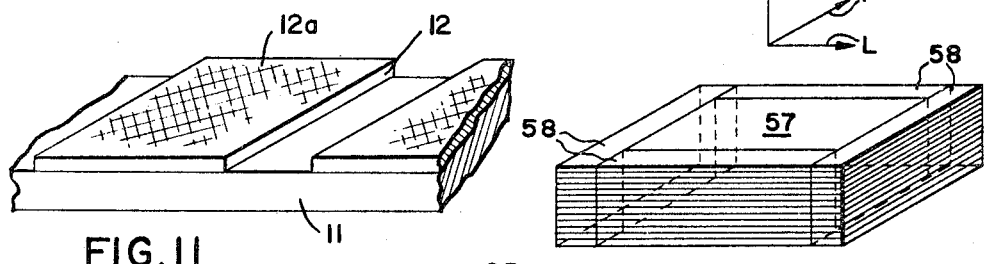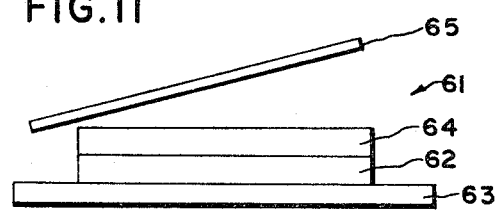

United States Patent Office 3,449,819
Patented June 17, 1969

3,449,819
EXPLOSIVELY WELDED HONEYCOMB METHOD
George F. Blank, Concord, Calif., assignor to Hexcel Corporation, Dublin, Calif., a corporation of California
Continuation-in-part of applications Ser. No. 648,177, Apr. 7, 1967, and Ser. No. 439,864, Mar. 15, 1965. This application May 17, 1968, Ser. No. 740,792
Int. Cl. B23k 27/00, 29/00, 31/02
U.S. Cl. 29—470.9                               16 Claims

ABSTRACT OF THE DISCLOSURE

A method for forming a honeycomb structure by disposing a series of spaced parallel strips of a stop weld material along one surface of each of a plurality of thin metallic sheets. The sheets are stacked and an explosive shock wave is directed through the stack to cause the sheets to weld together at those surface areas which are devoid of stop weld material. The thickness and configuration of stop weld material can be varied with the type of metal being bonded and the physical properties desired for the honeycomb. The foils can be stacked so that the edges of the stop weld form an angle with a plane normal to the broad surface of the foils. Momentum traps, adjacent the edges of the foils, can be employed to prevent cutting at the foil edges.

---

This is a continuation-in-part of U.S. patent application, Ser. No. 648,177, filed Apr. 7, 1967, now abandoned, which is a continuation-in-part of U.S. patent application Ser. No. 439,864, filed Mar. 15, 1965, now abandoned.

The present invention relates in general to a method of making honeycomb and particularly to the method of forming honeycomb before expansion by successfully joining an unlimited number of metal foils together in selected regions by explosive welding.

Broadly stated, the present invention to be described in greater detail below relates to a method wherein broad parallel strips of stop weld material are provided on at least one face of metallic sheets or foils defining weld regions between strips of stop weld, stacking a plurality of such sheets with the position of the weld regions lying at the obverse face of a given sheet staggered with respect to the weld regions at the reverse face of such sheet and directing a shock wave onto the stack of sheets to join adjacent sheets along weld regions therebetween. Stop weld material is distributed and arranged on the sheets so as to prevent joinder of the sheets in the regions throughout the stack occupied by the stop weld material without permitting severance of the sheets at the edges of the stop weld regions when subjected to the shock wave.

The use of shock waves created such as by explosives is achieving greater acceptance for the formation and joining of metals. Typical methods of utilizing explosives for these purposes are described in U.S. Patents Nos. 3,031,746, 3,036,373, 3,137,937 and 3,264,731.

Utilization of explosive welding for bonding metal sheets or foils together has a number of advantages over joining methods previously utilized. Principally, explosive welding eliminates the necessity for an intermediate material such as a brazing metal or an adhesive which limits the structural characteristics of the ultimate material formed therefrom. The bond produced between a pair of members by explosive welding can be as strong as the members themselves. Another important advantage obtained when utilizing explosive welding is the reduced fabrication time. Once the stack of sheets has been arranged for accomplishing the weld by explosive welding, the weld itself can be accomplished substantially instantaneously. This reduction in time factor reduces labor and operating costs and reduces the length of time during which the members being joined are subjected to extraordinary temperatures and pressures wihch may deleteriously affect their strength properties. Still further, use of the explosive welding permits the bonding of certain elements together which has not heretofore been possible because of oxides existing or reactions taking place during conventional welding processes. Joinder of the members is accomplished so rapidly with explosive welding that these oxides and/or reactions are disrupted and prevented from inhibiting the joinder of the members.

To date attempts to form honeycomb before expansion utilizing explosive welding have been only partially successful since until now the number of sheets that could be welded by use of an explosive shock wave has been limited, thereby limiting the ultimate size of the honeycomb after expansion. One of the difficulties encountered in the attempts to utilize explosive welding for the formation of honeycomb before expansion has been cutting damage occurring at the node regions of the stack of foils and in a random manner throughout the stack of foils. The random cutting shows no relation to the stop weld or node pattern and is therefore believed to be primarily dependent upon factors other than the makeup of the pack of foils. Node cutting, on the other hand, is directly related to the node pattern and sheet spacing and occurs due to a shearing action when a node is forced to move relative to the adjacent stop weld material. In order to avoid node cutting, the thickness of the stop weld material must be maintained at an absolute minimum.

In the present invention it has been learned that, in the formation of honeycomb from thin metallic foils, the necessary thickness of stop weld material for welding the maximum number of metal foils will depend on the type of metal employed. However, irrespective of the type of metal, the minimum thickness of stop weld required has been found to be about 80 microinches. Thicknesses greater than about 1,000 microinches have not been found to be advantages. Additionally, any material which has the physical properties as set forth hereinafter can be advantageously employed as the stop weld material. As hereinafter more fully discussed, materials that are either adhesive or non-adhesive are suitable.

In order to weld the maximum number of foils in a given stack without node cutting, it is desirable to reduce the number of unsupporting foils beneath a given node region to be welded so as to reduce the shearing action of the given node region on the edge of the stop weld material immediately therebelow. In accordance with another aspect of the present invention, the number of unsupported foils beneath a given node region is reduced by arranging the normally corresponding edges of node regions on opposite sides of two adjacent sheets in the stack in a plane which makes an angle with the plane normal to the broad surface of the sheets. With this construction the node regions throughout the stack are not aligned with the direction of the shock wave so that only a limited number of upsupported node regions lie beneath a given node region thereby preventing shearing action which produces node cutting. The number of unsupporting foils beneath a given node region is controlled by the foil thickness, the node width and the angle of inclination of the plane containing the node edges with respect to the plane normal to the face of the foils.

In combination with the increased number of foils that can be welded utilizing a stop weld material of minimum thickness and/or an angular arrangement of node edges, it has been discovered that the number of foils to be welded with a given energy shock wave can be increased by increasing the thickness of the stop weld material near the bottom of the stack to permit acceleration of the node regions located there when the shock wave has been partially attenuated.

While the utilization of the present invention as described above permits joinder of a maximum number of foils in a given pack, there are still limitations on the number of foils that can be welded since the shock wave passing through the stack of sheets is attenuated as it propagates. In order to permit fabrication of honeycomb before expansion with an unlimited number of foils, it has been discovered possible to form the unexpanded honeycomb pack by welding the stack of sheets together and, in the same step, to the top sheet of a stack of sheets previously welded together.

In accordance with another aspect of the present invention, cutting at the edges of the foil stack is prevented by the provision of a momentum trap located adjacent the edges of the foil stack. This momentum trap preferably is of the same composition as the foil stack, i.e., the trap at each edge is made up of a stack of foils similar to those of the stack and arranged in close abutment with the edges of the foils of the stack. With this construction it is believed that the shock waves traveling the length of the sheets are primarily transmitted into the sheets in the momentum trap and reflections and primary absorption take place in the sheets of the momentum trap. Additionally, with the momentum trap surrounding the edges of the unexpanded honeycomb stack, a support is provided for overhanging edges of an explosively activated flying plate that may be used to produce the shock wave on the stack. The trap also shields the stack from the deleterious effects of the explosive gases.

Solid metal bars, arranged in a similar manner as the HOBE momentum traps, are equally successful in eliminating potential damage from shock wave interactions. In addition, it is advantageous to arrange solid metal bars, unsupported by the back-up plate, but adjacent the edges of the foil stack, where they are driven downward by the impact of an overlapping flying plate and do not absorb or negate the impact of the plate.

In still another aspect of the invention, it has been found that the strength of the expanded honeycomb can be substantially increased by providing the individual foils which form the honeycomb cell walls with microscopic corrugations. These corrugations are produced by providing the strips of stop weld material, preferably after drying, with surface cross-hatching. When the honeycomb foils are subsequently explosively welded, the irregularities in the surface of stop weld result in distortion of the foil, thereby embossing the configuration of the cross-hatching to the honeycomb foil.

Other objects of the present invention will become apparent upon reading the following specification and referring to the accompanying drawings in which similar characters of reference represent corresponding parts in each of the several views.

In the drawing:

FIG. 6 is a perspective view of a stack of sheets incorporating another aspect of the present invention;

FIG. 7 is an enlarged elevational sectional view of a portion of the stack illustrated in FIG. 6;

FIG. 8 is a view similar to FIG. 7 illustrating another embodiment of the present invention;

FIG. 9 is a perspective view of a stack of sheets and associated momentum traps located at its edges in accordance with still another aspect of the present invention;

FIG. 10 is a side elevational view schematically illustrating still another aspect of the present invention; and FIG. 11 is a fragmentary perspective view illustrating the cross-hatching on the stop weld material for producing coresponding embossing on the honeycomb ribbons.

Figure 1:
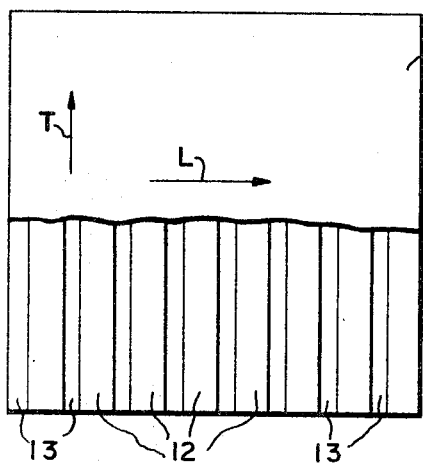
FIG. 1 is a plan view partially broken away of a stack of foils prepared for explosive welding in accordance with the present invention.
Figure 2:
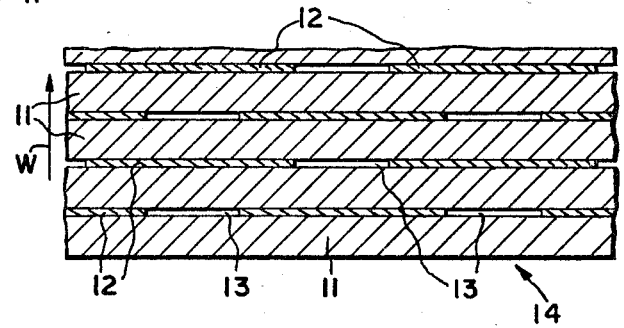
FIG. 2 is an enlarged cross-sectional view of a portion of the stack as illustrated in FIG. 1.
Figure 3:
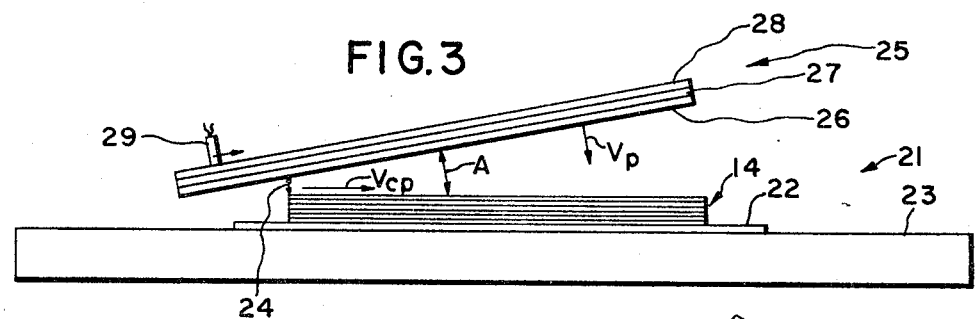
FIG. 3 is a side elevational view schematically illustrating one assembly utilized for producing explosive welds.

Referring now to FIGS. 1–3, a plurality of thin metallic foils or sheets 11 such as aluminum typically in the thickness range of 0.0015 to 0.0025 inch are covered on one face with substantially equally spaced apart broad parallel strips of weld preventing or stop weld material 12, to be described in greater detail infra, to a desired thickness which will prevent the occurrence of a weld between adjacent such sheets 11 when subjected to a high energy shock wave.

The width and spacing of the strips of stop weld 12 are such as to define weld regions 13 on the face of the sheets therebetween and at which the noeds occur in the sheets after welding and expansion. The sheets 11 are stacked one on top of another with the position of the weld regions 13 lying at the obverse face of a given sheet 11 staggered with respect to the position of the weld regions 13 at the reverse face of that given sheet 11, and this stack of sheets is placed in an explosive welding assembly for producing welds between the sheets at the weld regions 11.

While other techniques for producing and directing the shock wave through the stack are possible, the present invention will be described with respect to the flying plate technique which utilizes a plate having a high velocity $V_p$ to produce the desired impact pressure and inclined to produce a high collision point velocity $V_{cp}$ to achieve the desired weld.

Referring to FIG. 3 there is illustrated a flying plate forming assembly 21 in which the stack 14 is placed on top of a weld preventing material 22 on the top surface of an anvil 23 for preventing welding of the stack to the anvil 23 during application of the high energy shock wave. Above the top surface of the stack 14 at a given stand-off distance 24 a flyer plate assembly 25 is positioned for producing sufficiently high impact pressures to a flying plate arranged at such an angle A that the point of contact between the flying plate and metal to be bonded travels at a subsonic velocity $V_{cp}$ across the stack. For this purpose the flyer plate assembly includes a flyer plate 26 such as of aluminum, an attenuator sheet 27 such as of rubber and a layer of explosive 28 such as, for example, Du Pont's explosive EL506D to be detonated by a detonator 29 located at the end of plate 26 closest to the stack 14.

With this assembly, when the explosive 28 is detonated by the detonator 29, impact between the flyer plate 26 and the stack of sheets 14 is accomplished thereby producing welds at the weld regions 13. For welding to occur, the collision point velocity $V_{cp}$ must be less than the velocity of sound in the material being welded which in the case of aluminum is 20,000 feet per second. Since the detonation velocity of explosive 28 described above is 23,300 feet per second, a $V_p$ of 19,000 feet per second is produced with an angle A of 2¼°. The flyer plate 26 is usually displaced the small stand-off distance 24 so that the plate is accelerated by the explosive pressure before contacting the stack 14. It will be appreciated by those skilled in this art that flyer plate 26 can be disposed parallel to the stack of sheets 14 when an explosive is provided which has a variable detonation velocity. Such an alignment of flyer plate 25 is preferred.

The extremely high pressures (several million pounds per square inch) acting for a short time interval (20–30 microseconds) produce a wave or ripple on the metal surface which is accompanied by an increase in surface area of 4 to 10 times. This rippling results in the bringing together of clean surfaces of two pieces of metal at high pressure and thereby producing a weld.

Figure 5:
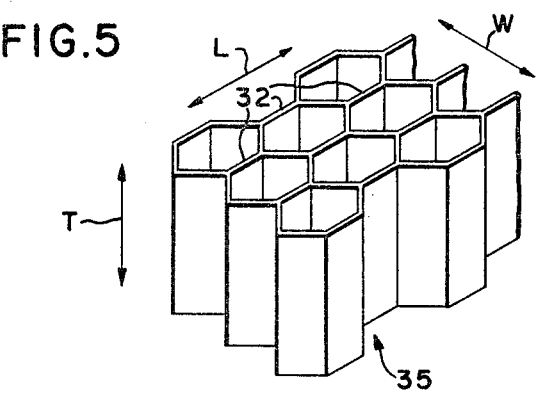
FIG. 5 is a perspective view of the structure illustrated in FIG. 4 after expansion.
Figure 4:
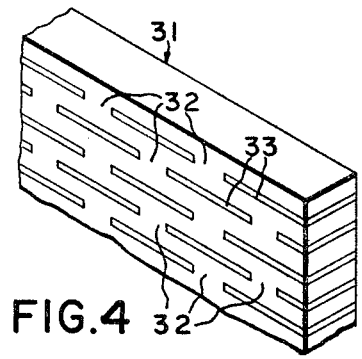
FIG. 4 is a perspective view of a portion of the stack of explosively welded unexpanded honeycomb.

FIG. 4 illustrates a section 31 cut from the welded stack and illustrating the weld regions 32 where a solid state bond is produced between adjacent foils in the initial stack and in which the stop weld material 33 remains embedded in the stack. This stack 31 is expanded in any conventional manner to produce expanded cellular honeycomb such as section 35 illustrated in FIG. 5.

While other materials such as, for example, aluminum oxide and sodium silicate can serve as a stop weld material, I have found non-abrasive adhesive-type materials that are plastic or rubbery such as polyvinyl alcohol are sufficiently resilient to provide a stand-off distance through which the sheets 11 can be accelerated during the welding step as will appear in greater detail below. This is important where a large number of sheets are stacked one on top of another for welding with one shock wave. This material serves as a combination stop-off, adhesive and spacer, and since it is water soluble it can be easily removed after the weld is complete. The strips of stop weld material 12 can be applied to the sheets in any convenient manner such as in an aqueous solution with a rotogravure roller. It has been discovered that the polyvinyl alcohol adheres better to the sheets 11 when a small amount of sugar is added to the aqueous soltuion.

The term "stop weld" is meant to define all those materials which are suitable for the practice of this invention. These desired materials include those compositions which display certain physical properties. Among these, the stop weld material can advantageously possess the dual properties of (1) preventing explosive welding at those metal surface areas to which it is applied while (2) exhibiting adhesive characteristics necessary to maintain the stack of thin metal sheets in positive alignment prior to and during the explosive welding operation. In addition the stop weld composition should remain disposed at those surface areas to which it is initially distributed. That is, it should either dry quickly or at least to a sufficient degree to remain distributed in the pattern intended without interfering with the welding of those foil areas to which the stop weld material was not originally applied.

It is further advantageous to provide a stop weld composition which will not interfere with the subsequent physical expansion of the bonded metal structure. Therefore, it is important that the stop weld not form a permanent bond with the particular metal being explosively welded. Removal of the stop weld composition can then be most effectively accomplished after the bonded sheets have been expanded into the final form desired.

The stop weld substance should also be capable of uniform application, i.e., the composition should be suitable for application in a constant thickness. In this manner, the attenuation of the explosive force will tend to be uniform across each layer of stop weld material. It is also desirable that the stop weld composition dry rapidly without remaining tacky. The stop weld material should not exhibit adhesive characteristics at ambient temperatures so that the coated foil can be stored in overlapping layers, e.g., on convolute rolls, without adhering to each other. Therefore, it is desirable that the adhesive characteristics of the stop weld composition develop either at elevated temperatures or pressures such as occur during stacking and welding.

Alternately, it has been found that by employing a thin sheet, i.e., 0.1–1.0 inch, of a low density material such as Styrofoam, as a spacer between the stack of foil sheets and the flyer plate, the need for an adhesive stop weld material is eliminated. Apparently, the low density material uniformly distributes the impact of the explosive force across the entire surface so that the relative position of the foils is not affected.

Again it is advantageous to employ a stop weld composition which is wear resistant. This is particularly important when the coated foil will be extensively handled prior to the welding operation. In addition, a stop weld composition which is to some degree compressible assists in the explosive welding that occurs immediately adjacent to the areas to which the composition has been applied.

In the preferred application, it is desirable that the stop weld composition be water-soluble. In this manner, the stop weld composition can be removed from the bonded sheets after physical expansion of the structure has been completed. Of course, it will be apparent to one skilled in this art that solvents other than water can be employed. In those cases, it is not necessary that the stop weld composition be water-soluble, only that it be soluble in whatever other solvent is employed. A choice of some other solvent will of course depend on the operating conditions and economic factors which might be present.

Although the stop weld composition can be applied to the sheets of metal by any method known to one skilled in this art, a direct rotogravure printing process has been found to provide a suitable means of application.

Referring now to compositions which have been found to be of particular advantage, certain compositions which contain polyalkenyls are especially suitable. For example, polyvinyl acetate emulsions such as those available under the trademark Gelva from the Swaninigan Product Corporation have been found to be satisfactory. Other compositions including polyvinyl alcohols are also advantageous provided that they possess the aforementioned characteristics.

The physical properties of compositions such as the polyvinyl acetate emulsions have been found to be further enhanced when small amounts of certain other organic materials are mixed therewith. For example, table sugar (the disaccharide having the chemical formula $C_{12}H_{22}O_{11}$) increases the adhesive characteristics of the stop weld composition when applied to metallic sheets such as aluminum and steel. In still another aspect, certain viscous compositions such as the carboxy vinyl polymers of extremely high molecular weight, which are available under the trademark Carbopol from the B. F. Goodrich Chemical Co. can be employed to modify the viscosity of the polyvinyl acetate emulsion. Of course, it will be obvious to one skilled in this art that other ingredients can be combined with the aforementioned components to produce a stop weld composition having the properties desired.

In order to produce an explosive weld at node regions between adjacent foils or sheets, prevent welds in the anti-node regions, and limit the likelihood of node cutting, a certain minimum thickness of stop weld material is necessary. This minimum thickness is one which will produce a continuous layer of stop weld material thereby preventing intimate contact between the foils being welded. It has been discovered that in order to weld a reasonably large number of thin sheets together, such as 200, an 80 microinch thick stop weld film is necessary. The optimum thickness of stop weld composition varies with different metals. The following thicknesses have been found to be advantageous: aluminum—80 microinches; titanium—200 microinches; stainless steel—300 microinches. As previously mentioned, thicknesses greater than 1,000 microinches are not usually necessary.

Thinner continuous layer films such as on the order of 50 microinches are possible where low flyer plate velocities are utilized for bonding a fewer number of sheets. Typically, the flyer plate velocity must be 4,600 feet per second or more to assure bonding penetration through at least a stack of 200 sheets 0.0015 inch thick. For example, tests show that while no bonding will take place through 80 microinch stop weld at flyer plate velocities of 4,600 feet per second during welding of 250 aluminum sheets each 0.0015 inch thick, the top 130 sheets of a similar stack and velocity but with stop weld 50 microinch welded right through the stop weld material, and welds at the node regions were achieved only through 200 sheets. Some bonding even occurred through the stop weld when the plate velocity was reduced to 3,350 feet per second at which velocity even fewer sheets could be welded.

In accordance with another aspect of the present invention, as illustrated in FIGS. 6 and 7, the arrangement of the edge of the node regions or the edges of the stop weld material are positioned in a plane arranged at an angle B with respect to the plane normal to the broad surface of the foils. As illustrated, the foils 41 are provided with parallel strips of stop weld material 42 which which define weld regions 43 therebetween in the stack 44. This is accomplished when stacking the foil 41 by arranging the edges of partially superposed strips 45 and 46 of stop weld material located between adjacent pairs 47 and 48 of sheets 41 in the stack in a plane aligned at an angle B with respect to the plane Y normal to the face of the sheets. The angle arranged node or weld regions appear along the edge of the stack 44 illustrated in FIG. 6 where Z represents those regions through the stack not interrupted by open weld regions.

Control of node cutting by allowing small node displacement at the angle B permits an unlimited number of sheets in the stack. In addition, angle B provides for uniform shock wave continuation. The number of unsupporting sheets beneath any node is controlled by the foil thickness F, the node angle B, and the node width N. Thus, if the relative node displacement per sheet is designated D and the stop weld thickness designated S, the sheet displacement is described by the following equation:

$$\tan B = D/F + S$$

Then the condition for node support in the honeycomb before expansion so as to prevent node cutting is $$M = N/D$$

where M is the maximum number of unsupporting sheets beneath a given node.

The displacement of the foils 41 to produce the angular arrangement of stop weld material 42 can be accomplished in a number of different ways. For example, the angle B can be provided by "fanning" the thin metallic sheets. This is accomplished by first aligning the sheets containing stop weld in vertical registration. Thereafter, one end of the stack is clamped and the stack rotated about an intermediate pivot point. The opposite end of the stack is then clamped in the pivoted position and the first end released. When the sheets are again flattened out, the foils are uniformly displaced relative to each other. By utilizing this procedure, the angle B can be controlled merely by varying the degree to which the clamped end of the stack is rotated.

In addition, by providing a colored stop weld material, fanning of the foils to provide the desired angular registration also will produce a check on the position of each sheet, i.e., it will be visibly apparent from the color dispersion whether there are any sheets that are face down rather than face up.

In accordance with another aspect of the present invention illustrated in FIG. 8, the thickness of the stop weld material between the sheets 50 of the stack 54 is increased from a thin stop weld 51 on the order of the minimum stop weld thickness described above to a thicker stop weld 52 defining the weld regions 53 near the bottom of the stack. The change in thickness may either be gradual toward the bottom of the stack or stepwise increased toward the bottom of the stack to provide an increased stand-off distance between sheets near the bottom of the stack to permit acceleration of the sheets when the shock wave has been substantially attenuated. Since the shock wave is substantially attenuated near the bottom of the stack, node cutting is not as much a problem as further on up in the stack.

In order to reduce the cutting of the foil sheets adjacent their edges, it has been discovered that momentum traps can be provided around the stack of material to absorb shock waves traveling lengthwise of the sheets.

FIG. 9 illustrates a stack of sheets 57 such as the stack 54, 44 and 14 described above and surrounded at its edges by momentum traps 58. These momentum traps 58 are preferably stacks of foils similar to those which make up the stack 57 in close abutting relationship with the edges of the foils in stack 57 for absorbing shock waves transmitted from the stack 57 thereby decreasing the reflection of shock waves from the edges of the foils back into the stack 57. Reflection and absorption of the shock waves traveling transversely of the stack are therefore attenuated in the momentum traps 58 thereby reducing the anticipated damage to the foils of stack 57. Additionally, the momentum traps 58 serve as gas shields to shield the foils of stack 57 from the deleterious effect of gases generated during detonation of the explosive.

During certain experiments with the method in accordance with this invention the flyer plate utilized to direct the shock wave onto the stack of sheets was of an overall plan size greater than the plan size of the individual sheets so as to act as a gas shield for the edges of the stack. It was discovered that such a flyer plate often shears at the edges of the stack with resultant peripheral damage to the stack. It was discovered that this peripheral damage can be avoided by utilizing a plate which when in contact with the stack has a perimeter co-extensive with the perimeter of the stack. In such a case, the stack can be protected from deleterious gas effects by an elastic tape.

Due to the attenuation of the shock wave as it travels through the stack of foils to be welded, only a finite number of foils can be bonded together so that the W dimension of an explosively welded stack of foils is limited to this finite distance. FIG. 10 illustrates a method whereby packs of honeycomb before expansion can be produced of substantially infinite W dimensions. As illustrated in FIG. 10 the welding assembly 61 includes a lower, previously welded stack 62 of foils placed on an anvil 63 and an upper stack 64 of foils to be welded placed on top of the lower stack 62. With the flyer plate 65 located above the upper stack and detonated so as to generate the shock wave first through the upper stack 64 down to the lower stack 62, the foils in the upper stack 64 are welded at the desired regions and the lowermost foil in stack 64 is welded to the uppermost foil in stack 62. This process can be repeated with additional stacks of foils until the desired W dimension has been achieved.

It has been found useful to provide a discard plate such as on the order of .050 inch aluminum for the example given above to produce a cushioning effect on the top of the stack and thereby reduce damage to the top foils of the stack.

The following five illustrative examples of test results show the effects of the various aspects of the present invention on the production of honeycomb before expansion.

The sheets were cleaned with a standard detergent such as Turco 4142 (non-silicated), followed by a water rinse, and coated and adhesively held together with stop weld material of the following specific aqueous solution:

| Component: | Percentage based on total weight |
|---|---|
| 55% polyvinyl acetate emulsion | 55.0 |
| Sugar | 5.0 |
| Carboxy vinyl polymer | 0.5 |
| Water | 39.5 |

In all test cases the following parameters were held constant: Du Pont EL506D sheet explosive was used with a PL-2 detonator on a stack of aluminum sheets enclosed in an evacuated rubber lined chamber on a ½ inch aluminum anvil; the plate inclination A was 2¼°; the plate velocity $V_p$ was 4,600 feet per second and the collision point velocity was 19,000 feet per second. In test No. 29, .0020 inch thick 5052–H39 aluminum sheets were used; the explosive was .198 inch thick; detonation was in the T direction; the flyer plate was ⅛ inch thick aluminum; and the cell size was ⅜ inch. In all the other tests 2024 F aluminum sheets .0015 inch thick were used; the explosive was .200 inch thick; detonation was in the L direction; the flyer plate was ⅛ inch thick aluminum; and the cell size was ¼ inch.

TABLE

| Test No. | Specimen size | Stopweld thickness (microinches) | Depth of bond (in sheets) | General |
|---|---|---|---|---|
| 29 | 5″ T x 5″ L x 200 sheets | 50 | 160–200 | Strong bond to 160 sheets with welding through the stopweld for the first 50 sheets. |
| 39 | 3″ T x 4½″ L x 300 sheets | 50 (top 150 sheets) 120 (bottom 150 sheets). | 250 | In some areas strong welding persisted for 300 sheets; about 25% of the top 150 sheets were welded through the stop weld; increasing stop weld thickness increased bonding penetration. |
| 43 | 3″ T x 4½″ L x 225 sheets | 80 | 225 | No welding through stop weld; apparently some node cutting and some random damage. |
| 44 | 3″ T x 4½″ L x 250 sheets | 80, B=49° | 250 | No welding through stop weld; no node cutting but some random cutting. |
| 47 | 3″ T x 3.9″ L x 225 sheets | 80 B=49° (momentum trap). | 200 | Random and node cutting eliminated and no peripheral damage. |

As can be seen from the preceding table, a stop weld thickness of 50 microinches is not sufficient to prevent welding therethrough. Stop weld thickness of 80 microinches does prevent welding therethrough, and an increased thickness of stop weld toward the bottom of the stack permits increased penetration of the shock wave through the stack. The use of angle nodes prevents node cutting and the use of a momentum trap prevents random cutting.

In another embodiment, as illustrated in FIG. 11, the thickness of dried stop weld material 12 is varied, for example, by applying cross-hatching 12a. In this manner, subsequent application of the explosive shock wave produces microscopic corrugations in the surface of adjacent sheets 11 (not shown) which increase the strength to weight ratio by 10 to 20 percent. These corrugations are independent of the particular honeycomb configuration as they are imposed on the small flat planes which form each honeycomb cell. Although the extent of cross-hatching 12a can vary over a wide range, advantages have been found to result from applying from about 55 to about 120 lines of cross-hatching per inch of stop weld surface.

Although the ofregoing invention has been described in some detail by way of illustration and example for purposes of clarity and understanding, it is understood that certain modifications may be practiced within the spirit of the invention as limited only by the scope of the appended claims.

What is claimed is:
1. The method of forming honeycomb material comprising the steps of covering at least one face of each of a plurality of thin metallic sheets with substantially equally spaced apart broad parallel strips of stop weld material defining weld regions on the face of the sheets in between the strips of stop weld material; stacking a plurality of such sheets in a stack with the position of the weld regions lying at the obverse face of a given sheet staggered with respect to the position of the weld regions at the reverse face of said given sheet; and directing an explosively generated shock wave onto said stack of sheets to join adjacent sheets along weld regions therebetween, the stop weld material being distributed and arranged to prevent joinder of said sheets in the regions throughout the stack occupied by said stop weld material without causing severance of said sheets at the edges of said regions of stop weld material when subjected to said shock wave whereby upon expansion said stack of sheets forms a honeycomb material, the weld regions defining the nodes at which adjacent deformed ribbons making up the stack of material are joined together.

2. The method of forming honeycomb material in accordance with claim 1 characterized further in that said strips of stop weld material are about 80 microinches thick.

3. The method of forming honeycomb material in accordance with claim 1 characterized further in that said sheets are stacked with the edges of partially superposed strips between adjacent pairs of sheets defining a plane lying at an angle with respect to a plane normal to the top sheet of said stack.

4. The method of claim 1 characterized further in that said stop weld material is plastic and is compressed during acceleration of said sheets when subjected to said shock wave.

5. The method of claim 1 wherein the shock wave is directed onto the stack over a region which is co-extensive with the perimeter of edges of said sheets.

6. The method in accordance with claim 1 including the step of surrounding the edges of said stack with material in abutting relationship thereto for absorbing shock waves transmitting longitudinally of said sheets.

7. A method in accordance with claim 1 wherein the strength of the honeycomb material is increased by applying cross-hatching to the exposed surface of said parallel strips of stop weld material prior to stacking said sheets so that when said sheets are subjected to said shock wave, the portions of said sheets adjacent said cross-hatching will be provided with microscopic corrugations.

8. The method of forming metallic honeycomb material comprising the steps of: covering at least one face of each of a plurality of thin metallic first sheets with substantially equally spaced apart broad parallel strips of stop weld material of a given thickness sufficient to prevent a weld between two adjacent sheets of material when subjected to a high energy shock wave, said strips of stop weld material defining weld regions on the face of said first sheets in between the strips of stop weld material; covering at least one face of a plurality of thin metallic second sheets with substantially equally spaced apart broad parallel strips of stop weld material of a thickness greater than said given thickness and defining weld regions on the face of said second sheets in between the strips of stop weld material; arranging said first and second sheets in a stack with said second sheets at the bottom of said stack and with the position of the weld regions lying at the obverse face of a given sheet staggered with respect to the position of the weld regions lying at the reverse face of said given sheet; directing an explosively generated shock wave onto the top of said stack of sheets for joining adjacent sheets along the weld regions therebetween without joinder of such sheets in regions occupied by said stop weld material; and expanding said stack of sheets to form a honeycomb material.

9. The method in accordance with claim 1 including the step of stacking a second stack of a plurality of said sheets on said welded stack with the position of the weld regions lying at the obverse face of a given sheet in said second stack staggered with respect to the position of the weld regions at the reverse face of such given sheet in said second stack and directing a shock wave onto said second stack for joining adjacent sheets in said second stack at said weld regions therebetween without joinder at regions of said stop weld material and for joining said second stack to said previously welded stack.

10. The method of forming honeycomb material comprising the steps of: covering at least one face of each of a plurality of thin metallic sheets with substantially equally spaced apart, broad, parallel strips of stop weld material defining weld regions on the face of the sheet between the strips of stop weld material; stacking a plurality of such sheets in a first stack with the position of the weld regions lying at the obverse face of a given sheet staggered with respect to the position of the weld regions at the reverse face of said given sheet; directing an explosively generated shock wave against said first stack of sheets to weld adjacent sheets in said weld regions therebetween without joinder of such adjacent sheets in regions of stop weld material; stacking a second such stack of a plurality of such sheets on said welded first stack with the position of the weld regions lying at the obverse face of a given sheet in said second stack staggered with respect to the position of the weld regions at the reverse face of such given sheet in said second stack; and directing an explosively generated shock wave onto said second stack for joining adjacent sheets in said second stack at said weld regions therebetween without joinder at regions of said stop weld material and for joining said second stack to said first stack.

11. The method of forming metallic honeycomb material comprising the steps of: covering at least one face of each of a plurality of first thin metallic sheets with substantially equally spaced apart, broad, parallel strips of stop weld material of a thickness about 80 microinches and defining weld regions on the face of the sheet in between the strips of stop weld material; covering at least one face of second thin metallic sheets with substantially equally spaced apart broad parallel strips of stop weld material of a thickness greater than 80 microinches and defining weld regions in between the strips of stop weld material; stacking a plurality of sheets in a first stack with said second sheets below said first sheets and with the position of the weld regions lying at the obverse face of a given sheet staggered with respect to the position of the weld regions at the reverse face of said given sheet and with the edges of partially superposed strips between adjacent pairs of sheets in said first stack defining a plane lying at an angle with respect to a plane normal to the top sheet of said first stack; surrounding the edges of said first stack with material in abutting relationship thereto for absorbing shock waves transmitting longitudinally of said sheets; directing an explosively generated shock wave against said first stack of sheets to weld adjacent sheets in said weld regions therebetween without joinder of such adjacent sheets in regions of stop weld material; stacking a second such stack of a plurality of such sheets on said welded first stack staggered and partially superposed as such sheets in said first stack; and directing an explosively generated shock wave onto said second stack for joining adjacent sheets in said second stack and joining said second stack to said first stack.

12. In the method of explosively welding using a stop weld material in a thickness of at least 80 microinches to prevent the welding that part of a surface covered by said stop weld material wherein said stop weld material is applied as an aqueous solution comprising polyvinyl acetate emulsion in an amount sufficient to render said composition uniformly adhesive to said surface; a disaccharide having the formula $C_{12}H_{22}O_{11}$ in an amount sufficient to increase the adhesive characteristics of said composition with respect to said metal surface; and a carboxy vinyl polymer in an amount sufficient to increase the viscosity of said composition so that said composition will be maintained along those metal surface areas to which applied.

13. In the method of explosively welding using a stop weld material in a thickness of at least 80 microinches to prevent the welding that part of a surface covered by said stop weld material wherein said stop weld material is applied as on aqueous solution comprising about 55% by weight of a polyvinyl acetate emulsion, about 5% by weight of a disaccharide having the chemical formula $C_{12}H_{22}O_{11}$; and about 0.5% by weight of a carboxy vinyl polymer.

14. The method of forming honeycomb material comprising the steps of: covering at least one face of each of a plurality of metallic sheets with substantially equally spaced apart broad parallel strips of stop weld material defining weld regions on the face of the sheets in between the strips of stop weld material; stacking a plurality of such sheets in a stack with the position of the weld regions lying at the obverse face of a given sheet staggered with respect to the position of the weld regions at the reverse face of said given sheet and with the edges of partially superposed strips between adjacent pairs of sheets defining a plane lying at an angle with respect to a plane normal to the top sheet of said stack; directing an explosively generated shock wave onto said stack for joining adjacent sheets at the weld regions; and expanding the stack of material to form a honeycomb structure.

15. The method of claim 14 wherein the stop weld material adhesively secures said sheets together.

16. In the method of claim 15 in which, subsequent to the explosive bonding of said sheets, said stop weld material is removed by dissolution in a solvent.

References Cited
UNITED STATES PATENTS

| | | | |
|---|---|---|---|
| 3,031,746 | 5/1962 | Ciarleglio et al. | 29—497.5 |
| 3,036,374 | 5/1962 | Williams | 29—470.1 |
| 3,060,879 | 10/1962 | Staba | 29—421 |
| 3,121,283 | 2/1964 | Kaempen | 29—471.1 |
| 3,196,533 | 7/1965 | Ida et al. | 29—455 X |
| 3,205,574 | 9/1965 | Breonecke | 29—497.5 |
| 3,206,847 | 9/1965 | Keeleric | 29—471.1 |
| 3,281,930 | 11/1966 | Fordham | 29—470.1 |
| 3,327,382 | 6/1967 | Keeleric | 29—455 X |

JOHN F. CAMPBELL, *Primary Examiner.*

PAUL M. COHEN, *Assistant Examiner.*

U.S. Cl. X.R.

29—421, 455, 470.1, 472.3, 486, 497.5